United States Patent
Gregory et al.

(10) Patent No.: US 11,142,981 B2
(45) Date of Patent: Oct. 12, 2021

(54) PIPE PULL HEAD SYSTEMS AND METHODS

(71) Applicant: Trinity Bay Equipment Holdings, LLC, Houston, TX (US)

(72) Inventors: David Michael Gregory, Houston, TX (US); Shawn Christopher Ryan Poworoznik, Calgary (CA)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 16/807,923

(22) Filed: Mar. 3, 2020

(65) Prior Publication Data
US 2021/0277737 A1 Sep. 9, 2021

(51) Int. Cl.
*F16L 1/06* (2006.01)
*E21B 23/14* (2006.01)
*E21B 23/10* (2006.01)
*F16L 1/032* (2006.01)

(52) U.S. Cl.
CPC .............. *E21B 23/14* (2013.01); *E21B 23/10* (2013.01); *F16L 1/032* (2013.01); *F16L 1/06* (2013.01)

(58) Field of Classification Search
CPC .............. F16L 1/032; F16L 1/028; F16L 1/06
See application file for complete search history.

(56) References Cited

U.S. PATENT DOCUMENTS

| | | | |
|---|---|---|---|
| 2008/0181728 A1* | 7/2008 | Wentworth | F16L 55/1658 405/184.3 |
| 2008/0286051 A1 | 11/2008 | Duggan | |
| 2018/0202578 A1 | 7/2018 | Ziola et al. | |
| 2019/0135588 A1 | 5/2019 | Barbu et al. | |
| 2019/0211628 A1* | 7/2019 | Halderman | H02G 1/081 |

OTHER PUBLICATIONS

PCT International Search Report and Written Opinion for PCT/US2021/020442 dated May 19, 2021.

* cited by examiner

*Primary Examiner* — Sean D Andrish
(74) *Attorney, Agent, or Firm* — Conrad J. Hsu

(57) ABSTRACT

Techniques for implementing a pipe deployment system that includes a pull head, which is to be secured to a pipe segment that includes tubing. The pull head includes a pull plate with a guide tab and a pull plate fastener opening. The pull plate is to be secured to the tubing of the pipe segment at least in part by securing a threaded fastener in the pull plate fastener opening and a pipe segment fastener opening that is aligned with the pull plate fastener opening while the guide tab is oriented outwardly and directly abuts the tubing of the pipe segment. The pull head includes an end assembly, which includes an end cap to be secured to the pull plate and a pull ring to be secured to one or more cables to enable the pull head to be pulled into an external bore, through the external bore, or both.

13 Claims, 9 Drawing Sheets

PIPE PULL HEAD SYSTEMS AND METHODS

BACKGROUND

The present disclosure generally relates to pipeline systems and, more particularly, to a pull head that may be secured to a pipe segment to facilitate deploying the pipe segment in a pipeline system.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments in addition to pipe fittings (e.g., connectors), such as a midline pipe fitting and/or a pipe end fitting. Generally, a pipe segment may include tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid.

Additionally, in some instances, a pipe segment deployed in a pipeline system may be disposed within an external bore, for example, which is formed in the ground or which is the pipe bore of another pipe segment previously deployed in the pipeline system. To facilitate deploying a pipe segment within an external bore, in some instances, a pull head of a pipe deployment system may be secured to the pipe segment to enable the pipe deployment system to pull the pipe segment into and/or through the external bore. For example, the pull head may be secured to the pipe segment at least in part by inserting and securing a threaded fastener in a fastener opening in the pull head as well as a fastener opening in the tubing of the pipe segment, which is aligned with the pull plate fastener opening. However, the pull plate fastener opening may be implemented on a portion of the pull head that is to be inserted into the pipe bore of the pipe segment, which, at least in some instances, may limit the ability of an operator, such as a service technician, to determine a proper location at which to implement a corresponding pipe segment fastener opening in the tubing of the pipe segment and, thus, deployment efficiency of the pull head.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipe deployment system includes a pull head. The pull head is to be secured to a pipe segment that includes tubing that defines a pipe bore and a fluid conduit implemented in a tubing annulus of the tubing to facilitate disposing the pipe segment within an external bore. Additionally, the pull head includes a pull plate that includes a guide tab and a pull plate fastener opening, in which the pull plate is to be secured to the tubing of the pipe segment at least in part by securing a threaded fastener in the pull plate fastener opening and a pipe segment fastener opening that is aligned with the pull plate fastener opening while the guide tab is oriented outwardly and directly abuts the tubing of the pipe segment. Furthermore, the pull head includes an end assembly that includes an end cap to be secured to the pull plate and a pull ring to be secured to one or more cables to enable the pull head to be pulled into the external bore, through the external bore, or both.

In another embodiment, a method of securing a pull head to a pipe segment to facilitate disposing the pipe segment within an external bore includes laying a pull plate of the pull head against an outer surface of tubing of the pipe segment such that a guide tab on the pull plate directly abuts the tubing of the pipe segment and is oriented inwardly, implementing a pipe segment fastener opening in the tubing of the pipe segment based at least in part on where a pull plate fastener opening implemented in the pull plate overlaps with the tubing of the pipe segment while the guide plate on the pull plate directly abuts the tubing of the pipe segment and is oriented inwardly, inserting the pull plate of the pull head into a pipe bore of the pipe segment such that the guide tab on the pull plate directly abuts the tubing of the pipe segment and is oriented outwardly, securing the pull plate to the tubing of the pipe segment while the guide tab on the pull plate directly abuts the tubing of the pipe segment and is oriented outwardly at least in part by securing a threaded fastener in the pipe segment fastener opening and the pull plate fastener opening, and securing an end assembly of the pull head that includes a pull ring to the pull plate of the pull head to enable the pull head to be pulled into the external bore, through the external bore, or both.

In another embodiment, a pull head includes a pull plate, in which the pull plate includes a pull plate fastener opening that facilitates securing the pull plate to tubing of a pipe segment, a guide tab that extends out in a first direction, in which the guide tab is implemented to directly abut the tubing of the pipe segment and to be oriented inwardly to facilitate identifying a location at which to implement a pipe segment fastener opening in the tubing of the pipe segment that is to be aligned with the pull plate fastener opening, and a locking tab that extends out in a second direction opposite the first direction, in which the pull plate is to be secured to the tubing of the pipe segment while the locking tab is oriented inwardly and the guide tab is oriented outwardly. Additionally, the pull head includes an end assembly that includes an end cap to be secured to the pull plate and a pull ring to be secured to one or more cables to enable pulling the pull head.

DETAILED DESCRIPTION

Figure 1:
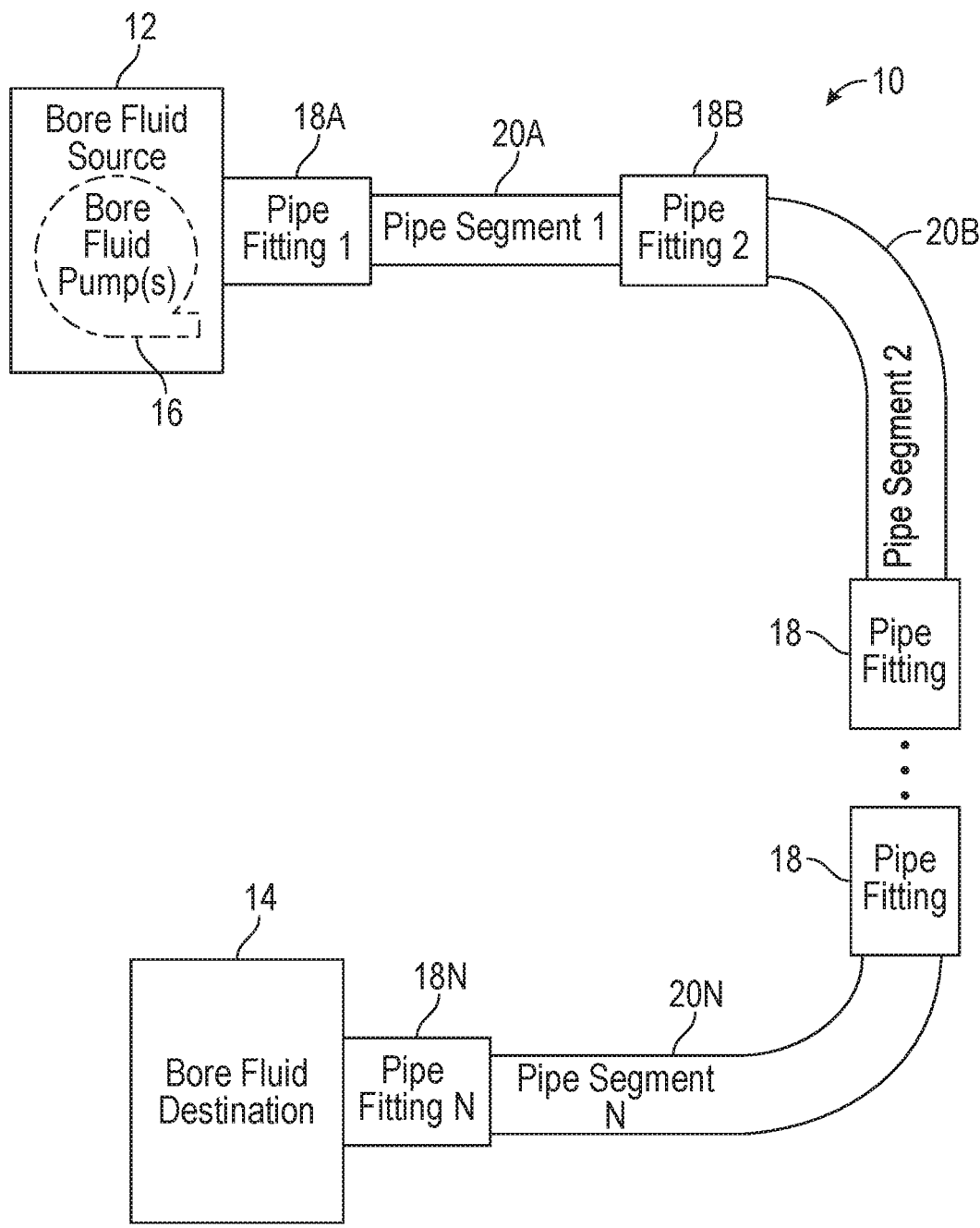
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments, which each includes tubing that defines (e.g., encloses) a corresponding pipe bore. More specifically, a pipe segment may generally be secured and sealed in one or more pipe fittings to facilitate fluidly coupling the pipe segment to another pipe segment, a fluid source, and/or a fluid destination. Merely as an illustrative non-limiting example, a pipeline system may include a first pipe end fitting that couples a first pipe segment to a fluid source, a midline pipe fitting that couples the first pipe segment to a second pipe segment, and a second pipe end fitting that couples the second pipe segment to a fluid destination.

Additionally, in some instances, a pipeline system may be implemented such that one or more pipe segments deployed therein are disposed within an external bore. For example, in some such instance, a pipe segment may be disposed in an external bore that is formed (e.g., drilled) in the ground. Additionally or alternatively, the pipe segment may be disposed in the pipe bore of another pipe segment that was previously deployed in the pipeline system, for example, to facilitate rehabilitating the pipeline system.

In any case, in some instances, a pipe deployment system may be implemented and/or operated to facilitate deploying a pipe segment within an external bore. In particular, the pipe deployment system may include a pull head, which is implemented to be secured to the tubing of a pipe segment, and one or more actuators, which may be coupled to the pull head via one or more cables, for example, which extend at least partially through the external bore. As such, the one or more actuators of the pipe deployment system may be operated to pull the pull head and, thus, a pipe segment secured to the pull head into and/or through the external bore.

To enable pulling into and/or through an external bore, the pull head of a pipe deployment system may be implemented such that its outer surface diameter is less than an inner surface diameter of the external bore and the tubing of a pipe segment to be deployed in the external bore may be implemented such that its outer surface diameter is also less than the inner surface diameter of the external bore. However, flow rate provided by a pipe segment often decreases as the inner surface diameter of its tubing decreases and the inner surface diameter of pipe segment tubing generally varies with the outer surface diameter of the pipe segment tubing. In other words, to facilitate optimizing (e.g., maximizing) flow rate, the outer surface diameter of the pipe segment tubing may be slightly smaller than the inner surface diameter of the external bore and, thus, minimal clearance (e.g., open space) may be present between the outer surface of the pipe segment tubing and the inner surface of the external bore.

As such, to facilitate optimizing flow rate provided by a pipe segment disposed in an external bore, in some instance, a pipe deployment system may include a pull head, which has an outer surface diameter that approximately matches an outer surface diameter of pipe segment tubing to be secured thereto, for example, such that the outer surface diameter of the pull head is less than or equal to the outer surface diameter of the pipe segment tubing. In other words, in such instances, the pipe deployment system may include an internal pull head, which is implemented to be secured to the tubing of the pipe segment from within its pipe bore. For example, the internal pull head may be secured to the pipe segment tubing at least in part by inserting and securing a threaded fastener, such as a nut and bolt pair, in a fastener opening implemented in the pull head as well as a corresponding fastener opening implemented in the pipe segment tubing. In other words, to facilitate securing the internal pull head to the pipe segment tubing, a pipe segment fastener opening may be implemented in the pipe segment tubing such that it is aligned with a corresponding pull head fastener opening implemented in the pull head. However, the pull head fastener opening may be implemented on a portion of the pull head that is to be inserted into the pipe bore of the pipe segment, which, at least in some instances, may limit the ability of an operator, such as a service technician, to determine a proper location at which to implement a corresponding pipe segment fastener opening in the tubing of the pipe segment and, thus, deployment efficiency of the pull head and/or the pipeline system.

Accordingly, to facilitate improving deployment efficiency, the present disclosure provides techniques for implementing and/or deploying a pull head such that the pull head facilitates identifying a proper location at which to implement a pipe segment fastener opening in the tubing of a pipe segment to be secured to the pull head. To facilitate identifying the proper location at which to implement a pipe segment fastener opening, the pull head may include one or more pull plates, which each include one or more pull plate (e.g., pull head) fastener openings as well as a locking tab and guide tab that extend out in opposite directions, for example, such that the guide tab is implemented between the locking tab and the one or more pull plate fastener openings. As will be described in more detail below, a pull plate of the pull head may be secured to the tubing of a pipe segment at least in part by inserting the pull plate into a pipe bore of the pipe segment such that its guide tab directly abuts the tubing of the pipe segment, its locking tab is oriented (e.g., facing) inwardly, and its guide tab is oriented outwardly.

Thus, to facilitate identifying a proper location at which to implement a pipe segment fastener opening in the tubing of a pipe segment, a pull plate of a pull head may be laid against the outer surface of the pipe segment tubing such that its guide tab directly abuts the pipe segment tubing, its guide tab is oriented (e.g., facing) inwardly, and its locking tab is oriented outwardly. By laying the pull plate against the outer surface of the pipe segment tubing in this manner, an operator, such as a service technician, may determine (e.g., identify) a proper location at which to implement a pipe segment fastener opening on the tubing of the pipe segment based at least in part on where a corresponding pull plate fastener opening in the pull plate overlaps with the tubing of the pipe segment. In other words, the pull plate may be laid against the pipe segment tubing while in a first orientation in which its locking tab is oriented outwardly and its guide tab is oriented inwardly during a first time period and subsequently secured to the pipe segment tubing while in a second orientation in which its locking tab is oriented inwardly and its guide tab is oriented outwardly during a second (e.g., subsequently and/or non-overlapping) time period.

To facilitate pulling a pull head and, thus, a pipe segment secured to its pull plates, the pull head may additionally include an end assembly, which is implemented to be secured to one or more pull plates of the pull head. In particular, the end assembly may include a pull ring, which is implemented to enable one or more cables to be secured to the pull head. Additionally, the end assembly may include an end cap, which is implemented to be secured to the locking tab of each pull plate.

To facilitate securing a pull plate thereto, in some embodiments, the end cap of an end assembly may include a locking tab opening with an insertion portion and a key seat portion, which is connected to and smaller than the insertion portion. In such embodiments, the insertion portion of the locking tab opening may be implemented to enable a locking tab of a pull pate to be inserted therethrough. After the locking tab of the pull plate has been inserted through the insertion portion of the locking tab opening in the end cap, the end cap may be rotated relative to the pull plate to move the pull plate from the insertion portion of the locking tab opening into the key seat portion of the locking tab opening. In other words, rotating the end cap relative to the pull plate may cause the locking tab on the pull plate to interlock (e.g., engage) with a solid portion of the end cap adjacent the key seat portion of the locking tab opening and, thus, facilitate securing the pull plate to the end cap. To facilitate maintaining a pull plate in the key seat portion of a locking tab opening in the end cap, in some embodiments, the pull head may additionally include a pin that is implemented to be inserted through a pin opening implemented in the locking tab and a corresponding pin opening implemented in the end cap.

Additionally, in some embodiments, the outer surface diameter of the end cap of a pull head may be less than or equal to an outer surface diameter of pipe segment tubing to be secured to the pull head to facilitate implementing an internal pull head. In particular, in some such embodiments, the end cap of a pull head may be an end cap plate. In other such embodiments, an end cap may include an extended side wall portion, for example, which extends out from an end plate portion of the end cap in an axial direction to facilitate blocking external environmental conditions from entering the pipe bore of a pipe segment to be secured to the pull head. Additionally or alternatively, to facilitate reducing the resistance to movement of a pull head and, thus, a pipe segment secured to the pull head, in some embodiments, the end assembly may additionally include a coned tip, which is implemented to be secured to an end cap of the end assembly, for example, via threading implemented on the coned tip and the end cap.

Moreover, the techniques described in the present disclosure may additionally or alternatively be used to implement and/or deploy an external pull head, which is at least in part secured circumferentially around the tubing of a pipe segment. To facilitate implementing an external pull head, in some embodiments, the end cap may be implemented to circumferentially cover a portion of pipe segment tubing to be secured to the external pull head, for example, such that the size of the end cap of the external pull head is expanded compared to the end cap of an internal pull head. In this manner, as will be described in more detail below, the present disclosure provides techniques for implementing and/or deploying a pull head such that the pull head facilitates identifying proper locations at which to implement pipe segment fastener openings in the tubing of a pipe segment to be secured to the pull head, which, at least in some instances, may facilitate improving efficiency with which the pull head may be secured to the pipe segment and, thus, deployment efficiency of a pipeline system in which the pipe segment is to be deployed using the pull head.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., two) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
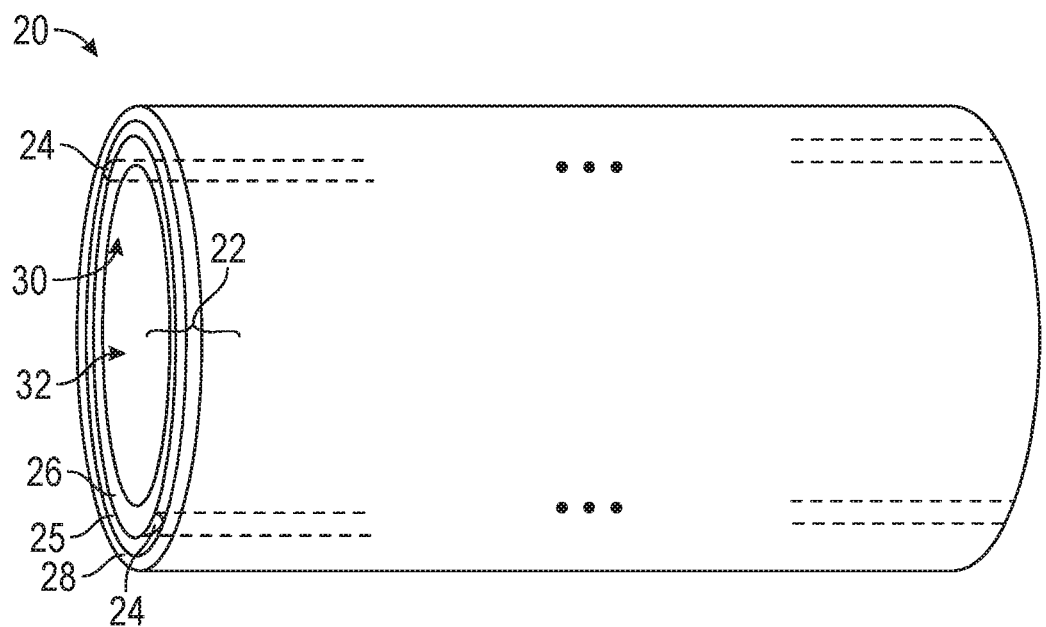
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in its annulus 25, is shown in FIG. 2. As depicted, the pipe segment tubing 22 is implemented with multiple layers including an inner (e.g., innermost) layer 26 and an outer (e.g., outermost) layer 28. In some embodiments, the inner layer 26 and/or the outer layer 28 of the pipe segment tubing 22 may be implemented using composite material and/or plastic, such as high-density polyethylene (HDPE) and/or raised temperature polyethylene (PE-RT). In any case, as depicted, an inner surface 30 of the inner layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner layer 26 and its outer layer 28. As will be described in more detail below, the tubing annulus 25 may include one or more intermediate layer of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, compared to solid pipe segment tubing 22 and/or pipe segment tubing 22 that does not include fluid conduits 24 implemented therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer (e.g., one) or more (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the axial (e.g., longitudinal) extent of the pipe bore 32.

Figure 3:
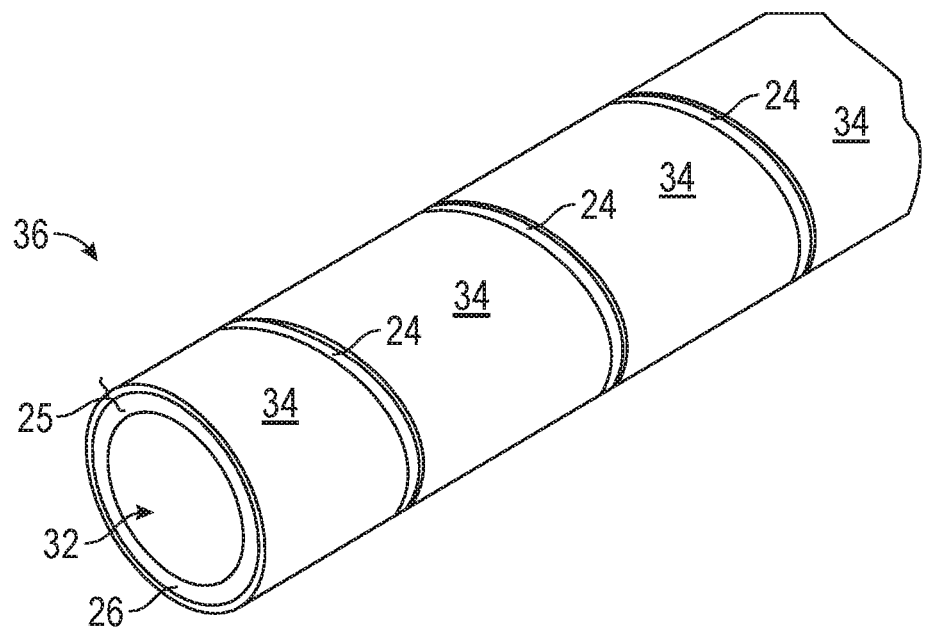
FIG. 3 is a perspective view of an example of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner layer 26 and an intermediate layer 34 included in the annulus 25 of its pipe segment tubing 22, is shown in FIG. 3. In some embodiments, one or more intermediate layers 34 of pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may enable communication of electrical (e.g., control and/or sensor) signals via the intermediate layer 34.

In any case, as depicted, the intermediate layer 34 is helically disposed (e.g., wound and/or wrapped) on the inner layer 26 such that gaps (e.g., openings) are left between adjacent windings to define a fluid conduit 24. In other words, in some embodiments, the intermediate layer 34 may be implemented at least in part by winding a metal (e.g., steel) strip around the inner layer 26 at a non-zero lay angle (e.g., fifty-four degrees) relative to the axial (e.g., longitudinal) extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer layer 28 may be disposed over the third other intermediate layer 34 and, thus, cover (e.g., define and/or enclose) the other fluid conduit 24 in the third other intermediate layer 34.

In any case, as described above, in some instances, one or more pipe segments 20 deployed in a pipeline system 10 may be disposed within an external bore. To facilitate disposing a pipe segment 20 in an external bore, a pipe deployment system may be implemented and/or operated to pull the pipe segment 20 into and/or through the external bore. In particular, to facilitate pulling the pipe segment 20, the pipe deployment system may include a pull head, which is implemented to be secured to the tubing 22 of the pipe segment 20.

Figure 4:
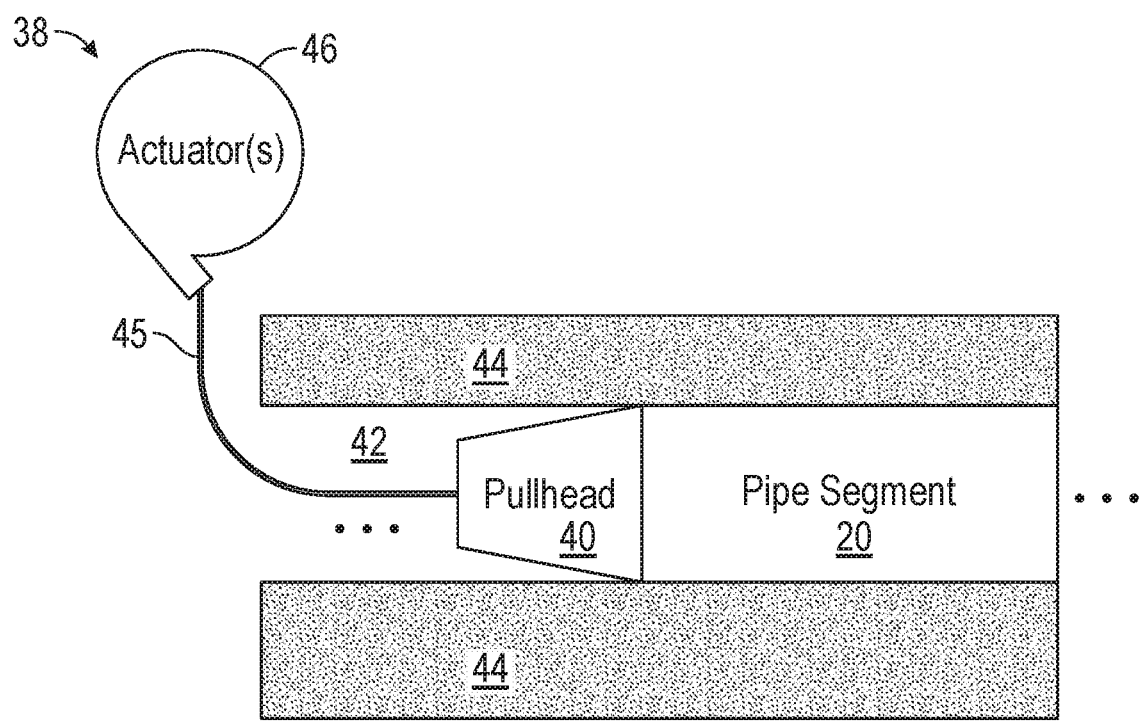
FIG. 4 is block diagram of an example of a pipe deployment system, which includes a pull head secured to a pipe segment, in accordance with an embodiment of the present disclosure.

To help illustrate, an example of a pipe deployment system 38, which includes a pull head 40 that is secured to a pipe segment 20, is shown in FIG. 4. As depicted, the pipe segment 20 is disposed within an external bore 42. In some embodiment, the external bore 42 may be a sub-surface bore formed in the ground 44. In other embodiments, the external bore 42 may be a pipe bore 32 of a different (e.g., previously deployed) pipe segment 20, for example, during a pipeline rehabilitation process.

In any case, to facilitate disposing the pipe segment 20 in the external bore 42, as in the depicted example, the pipe deployment system 38 may include one or more pull cables 45 and one or more actuators 46, such as an electric motor and/or an internal combustion engine, in addition to the pull head 40. In particular, as in the depicted example, the one or more pull cables 45 may be coupled between the pull head 40 and the one or more actuators 46. As such, the one or more actuators 46 may be operated to facilitate pulling the pull head 40 and, thus, the pipe segment 20 secured to the pull head 40 into and/or through the external bore 42.

Figure 5:
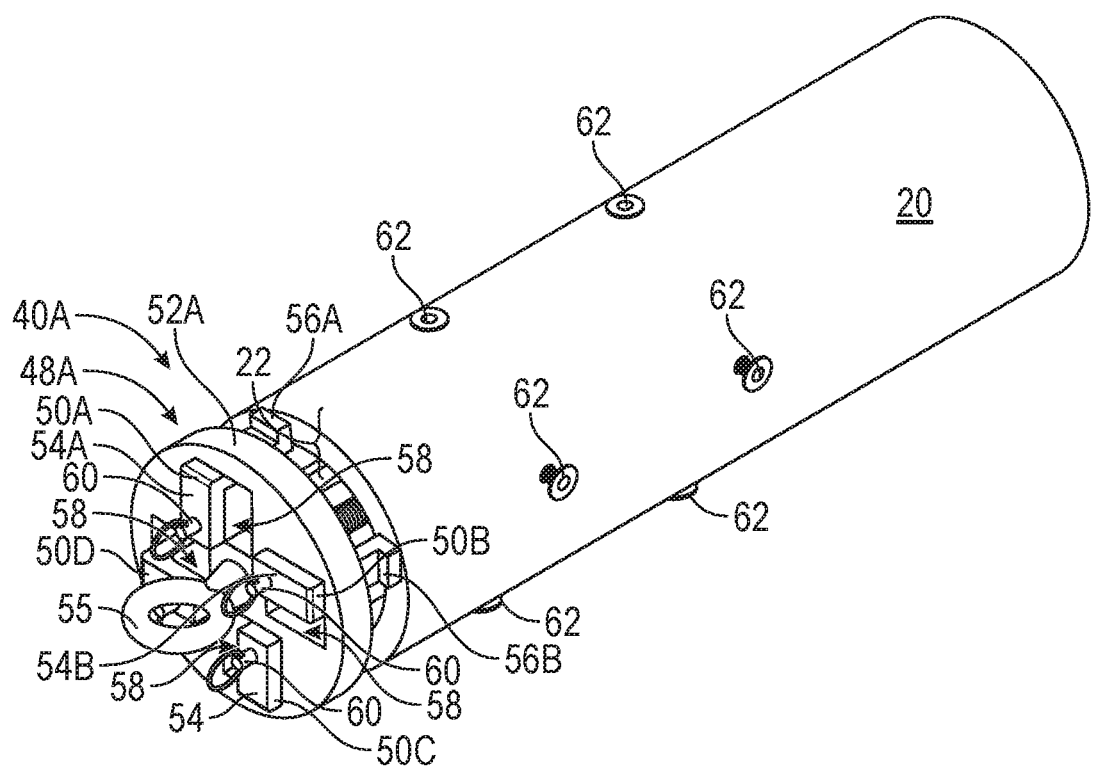
FIG. 5 is a perspective view of an example of the pull head, which includes pull plates and an end assembly, and the pipe segment of FIG. 4, in accordance with an embodiment of the present disclosure.

To help illustrate, an example of a (e.g., internal) pull head 40A secured to the tubing 22 of a pipe segment 20 is shown in FIG. 5. As depicted, the pull head 40A includes an end assembly 48A and multiple pull plates 50—namely a first pull plate 50A, a second pull plate 50B, a third pull plate 50C, and a fourth pull plate 50D. In particular, as depicted, the end assembly 48A include an end cap 52A, which is implemented to be secured to each of the pull plates 50, and a pull ring 55, which is coupled to the end cap 52A and implemented to be secured to one or more pull cables 45.

However, it should be appreciated that the depicted example is merely intended to be illustrative and not limiting. In particular, as will be described in more detail below, the techniques described in the present disclosure may additionally or alternatively be used to facilitate implementing and/or deploying an external pull head 40. Furthermore, as will be described in more detail below, in other embodiments, a pull head 40 may additionally include a coned tip, which is implemented to be secured to its end cap 52. Moreover, in other embodiments, a pull head 40 may additionally or alternatively include fewer than four (e.g., one, two, or three) pull plates 50 or more than four (e.g., five, six, seven, eight, or more) pull plates 50.

In any case, to facilitate securing the pull plates 50 of a pull head 40 to the end assembly 48 of the pull head 40, as in the depicted example, each pull plate 50 may include a locking tab 54 in addition to a guide tab 56, which extends out in an opposite direction relative to the locking tab 54. In particular, as depicted, the first pull plate 50A includes a first locking tab 54A and a first guide tab 56A, the second pull plate 50B includes a second locking tab 54B and a second guide tab 56B, and so on. Additionally, as depicted, each pull plate 50 is secured to the end cap 52A of the end assembly 48A while its locking tab 54 is oriented (e.g., facing) inwardly and its guide tab 56 is oriented outwardly.

As will be described in more detail below, to facilitate securing a pull plate 50 thereto, in some embodiments, an end cap 52 of a pull head 40 may include one or more locking tab openings 58, which each include an insertion portion and a key seat portion. In particular, in such embodiments, the insertion portion of a locking tab opening 58 in the end cap 52 may be implemented to enable the locking tab 54 of a pull plate 50 to be inserted through the locking tab opening 58. Additionally, the key seat portion of a locking tab opening 58 may be smaller than and connected to the insertion portion of the locking tab opening to enable a pull plate 50, which is inserted through the insertion portion of the locking tab opening 58, to be moved to the key seat portion of the locking tab opening 58 at least in part by rotating the end cap 52 relative to the pull plate 50. In this manner, the locking tab 54 on the pull plate 50 may interlock (e.g., engage and/or interface) with a solid portion of the end cap 52 adjacent the key seat portion of the locking tab opening 58 and, thus, facilitate securing the pull plate 50 to the end assembly 48A. To facilitate maintaining a pull plate 50 in the key seat portion of a locking tab opening 58, as in the depicted example, in some embodiments, a pull head 40 may include one or more pins 60, which are each implemented to be inserted and secured in a pin opening in the locking tab 54 of the pull plate 50 as well as a corresponding pin opening in the end cap 52 of the end assembly 48.

As in the depicted example, a pull plate 50 of a pull head 40 may also be secured to the tubing 22 of the pipe segment 20 while its guide tab 56 is oriented (e.g., facing) outwardly and its locking tab 54 is oriented inwardly. To facilitate securing the tubing 22 of the pipe segment 20 thereto, as in the depicted example, the pull head 40 may include one or more threaded fasteners 62, such as a nut and bolt pair. In particular, to facilitate implementing an internal pull head 40, a threaded fastener 62 may be secured in a pipe segment fastener opening implemented in the tubing 22 of the pipe segment 20 as well as a corresponding pull plate fastener opening implemented in a pull plate 50 of the internal pull head 40 from within a pipe bore 32 of the pipe segment 20.

Figure 6:
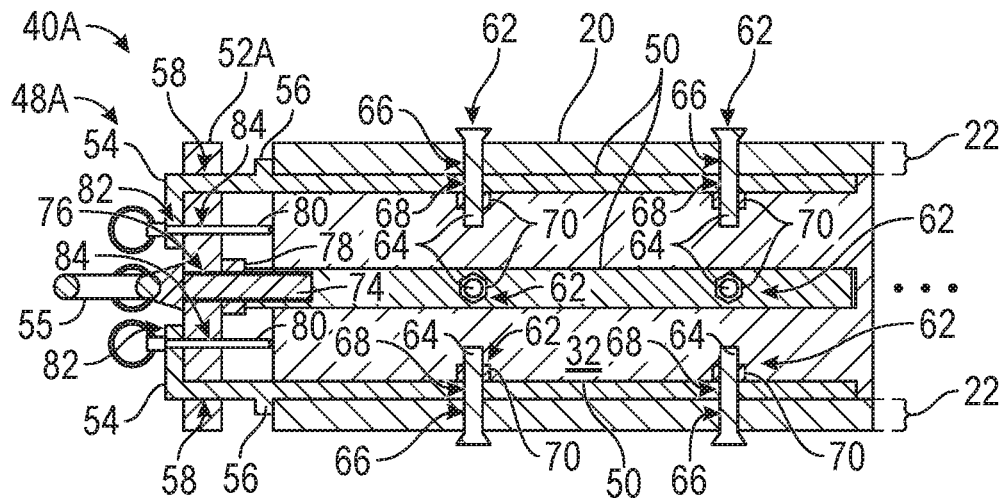
FIG. 6 is an axial cross-section profile of an example of the pull head and the pipe segment of FIG. 5, in accordance with an embodiment of the present disclosure.

To help illustrate, an example cross-section profile of a (e.g., internal) pull head 40A secured to the tubing 22 of a pipe segment 20 is shown in FIG. 6. To facilitate securing the pipe segment tubing 22 thereto, as in the depicted example, the pull head 40A may include one or more threaded fasteners 62, which are each implemented to facilitate securing the pipe segment tubing 22 to a corresponding pull plate 50 of the pull head 40A while a guide tab 56 on the pull plate 50 directly abuts the pipe segment tubing 22. In particular, as depicted, each threaded fastener 62 includes a fastener bolt 64, which is implemented to be inserted through a pipe segment fastener opening 66 in the pipe segment tubing 22 and a corresponding pull plate (e.g., pull head) fastener opening 68 in a pull plate 50, and a fastener nut 70, which is implemented to be secured to a threaded end of the fastener bolt 64 from within the pipe bore 32 of the pipe segment 20.

As described above, the pull plates 50 may also be secured to an end cap 52A in an end assembly 48A of the pull head 40A. To enable pulling the pull head 40A and, thus, the pipe segment 20 secured thereto, as described above, the end assembly 48A may additionally include a pull ring 55. As in the depicted example, in some embodiments, the pull ring 55 may be a discrete component with a threaded stem 74 and, thus, secured in a pull ring opening 76 implemented in the end cap 52A via one or more pull ring nuts 78.

However, it should be appreciated that the depicted example is merely intended to be illustrative and not limiting. In particular, in other embodiments, a pull ring 55 of a pull head 40 may be integrated with the end cap 52 of the pull head 40, for example, instead of being a discrete component. Additionally, as will be described in more detail below, in other embodiments, the pull ring 55 of a pull head 40 may be secured to a coned tip that is secured to an end cap 52 of the pull head 40, for example, instead of being secured directly to the end cap 52. Furthermore, although depicted as separated components, in other embodiments, one or more fastener nuts 70 of a pull head 40 may be integrated (e.g., tac-welded) with a corresponding pull plate 50 of the pull head 40. Moreover, as will be described in more detail below, in other embodiments, the end cap 52 of a pull head 40 may be implemented with a different shape, for example, such that the end cap 52 includes a plate portion and a sidewall portion that extends out from the plate portion of the end cap 52.

In any case, as described above, a pull plate 50 of the pull head 40A may be secured to the end cap 52A at least in part by interlocking (e.g., engaging and/or interfacing) a locking tab 54 on the pull plate 50 with a solid portion of the end cap 52A. To facilitate interlocking the locking tab 54 with a solid portion of the end cap 52A, as described above, the end cap 52A may include one or more locking tab openings 58. Additionally, to facilitate maintaining the interlocking between a locking tab 54 on a pull plate 50 and a solid portion of the end cap 52, as in the depicted example, in some embodiments, the pull head 40A may include pins 80, which are each implemented to be inserted and secured in a locking tab pin opening 82 implemented in the locking tab 54 of a pull plate 50 as well as a corresponding end cap pin opening 84 implemented in the end cap 52A of the pull head 40A.

Figure 7:
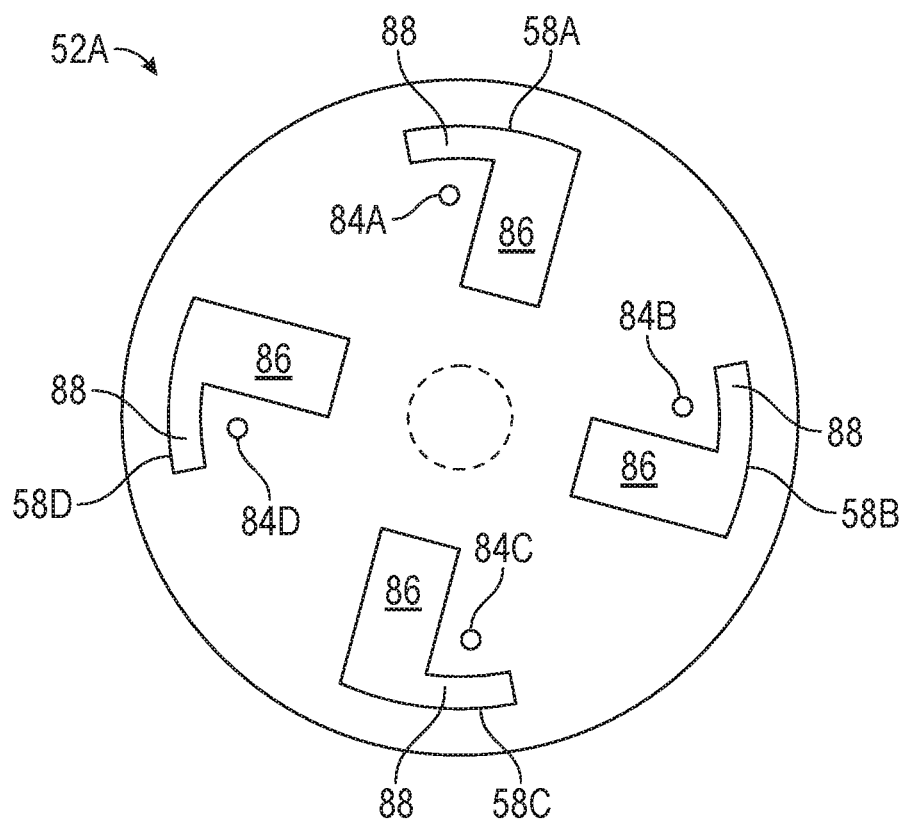
FIG. 7 is a front view of an example of an end cap included in the end assembly of FIG. 5, in accordance with an embodiment of the present disclosure.

To help further illustrate, a more detailed example of an end cap 52A, which may be used in an end assembly 48 of a pull head 40, is shown in FIG. 7. As depicted, the end cap 52A includes multiple end cap pin openings 84 and multiple locking tab openings 58, which each correspond with a pull plate 50 of the pull head 40. In particular, as depicted, the end cap 52A includes a first locking tab opening 58A and a first end cap pin opening 84A that correspond with a first pull plate 50A, a second locking tab opening 58B and a second end cap pin opening 84B that correspond with a second pull plate 50B, a third locking tab opening 58C and a third end cap pin opening 84C that correspond with a third pull plate 50C, and a fourth locking tab opening 58D and a fourth end cap pin opening 84D that correspond with a fourth pull plate 50D.

However, it should be appreciated that the depicted example is merely intended to be illustrative and not limiting. In particular, in other embodiments, an end cap 52 of a pull head 40 may include fewer than four (e.g., one, two, or three) locking tab openings 58 and/or fewer than four (e.g., one, two, or three) pin openings 84, for example, when the pull head 40 includes fewer than four pull plates 50. Alternatively, in other embodiments, an end cap 52 of a pull head 40 may include more than four (e.g., five, six, or more) locking tab openings 58 and/or more than four (e.g., five, six, or more) pin openings 84, for example, when the pull head 40 includes more than four pull plates 50.

In any case, as depicted, each locking tab opening 58 in the end cap 52A includes an insertion portion 86 and a key seat portion 88. In particular, the insertion portion 86 of a locking tab opening 58 may be implemented to enable the locking tab 54 of a pull plate 50 to be inserted therethrough. Additionally, as depicted, the key seat portion 88 of a locking tab opening 58 is connected to and smaller than the insertion portion 86 of the locking tab opening 58.

As such, returning to the pull head 40A of FIG. 6, rotating the end cap 52A relative to the pull plates 50 after the locking tabs 54 have been inserted through the insertion portions 86 of corresponding locking tab openings 58 may cause the pull plates 50 to move from the insertion portions 86 to the key seat portions 88 of the locking tab openings 58 and, thus, the locking tabs 54 on the pull plates 50 to interlock with solid portions of the end cap 52A. Moreover, as in the depicted example, in some embodiments, the end cap 52 of a pull head 40 may be a plate. In other words, in such embodiments, the end cap 52A of FIG. 6 may be a plate end cap 52.

However, it should again be appreciated that the depicted example is merely intended to be illustrative and not limiting. In particular, as mentioned above, in other embodiments, an end cap 52 of a pull head 40 may be implemented with a different shape. For example, in some other embodiments, an end cap 52 of a pull head 40 may include a plate portion and a sidewall portion, which extends out from the plate portion of the end cap 52.

Figure 8:
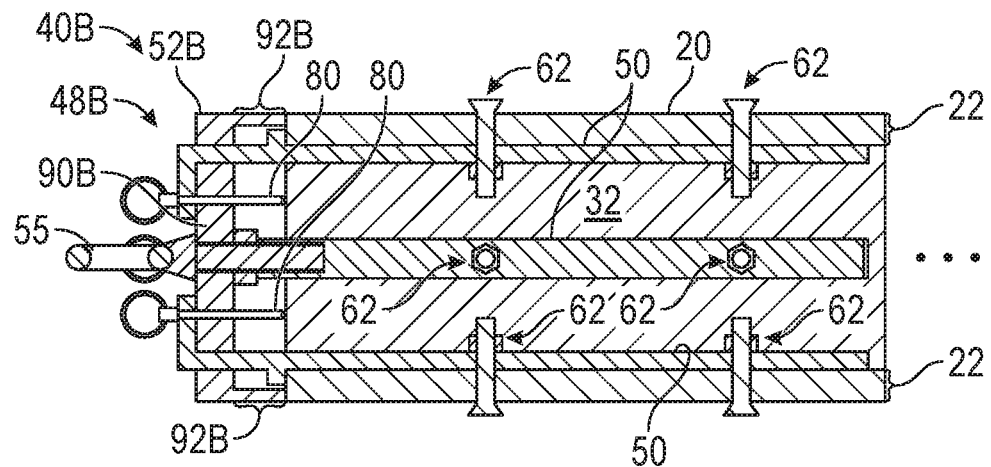
FIG. 8 is an axial cross-section profile of another example of the pull head and the pipe segment of FIG. 4, in accordance with an embodiment of the present disclosure.

To help illustrate, another example of a (e.g., internal) pull head 40B secured to the tubing 22 of a pipe segment 20 is shown in FIG. 8. As depicted, the pull head 40B includes pull plates 50, threaded fasteners 62, and pins 80. In some embodiments, the pull plates 50 of FIG. 8 may generally match the pull plates of FIG. 6, the threaded fasteners 62 of FIG. 8 may generally match the threaded fasteners 62 of FIG. 6, and/or the pins 80 of FIG. 8 may generally match the pins 80 of FIG. 6. Additionally, as depicted in FIG. 8, the pull head 40B includes an end assembly 48B, which includes a pull ring 55 and an end cap 52B. In some embodiments, the pull ring 55 of FIG. 8 may generally match the pull ring 55 of FIG. 6.

However, as depicted, the end cap 52B of FIG. 8 differs from the end cap 52A of FIG. 6. In particular, as depicted in FIG. 8, the end cap 52B includes a plate portion 90B as well as a sidewall portion 92B, which extends out from the plate portion 90B in an axial direction. In other words, the end cap 52B of FIG. 8 is extended toward the pipe segment tubing 22 (e.g., such that the end cap 52B directly abuts the pipe segment tubing 22) and, thus, may facilitate blocking external environmental conditions from entering the pipe bore 32 of the pipe segment 20.

However, it should be appreciated that the depicted example is merely intended to be illustrative and not limiting. In particular, as mentioned above, in other embodiments, the end assembly 48 of a pull head 40 may additionally include a coned tip. In such embodiments, the coned tip may be secured to an end cap 52 of the pull head 40 and, thus, may facilitate reducing the resistance to movement of the pull head 40 and a pipe segment 20 secured to the pull head 40.

Figure 9:
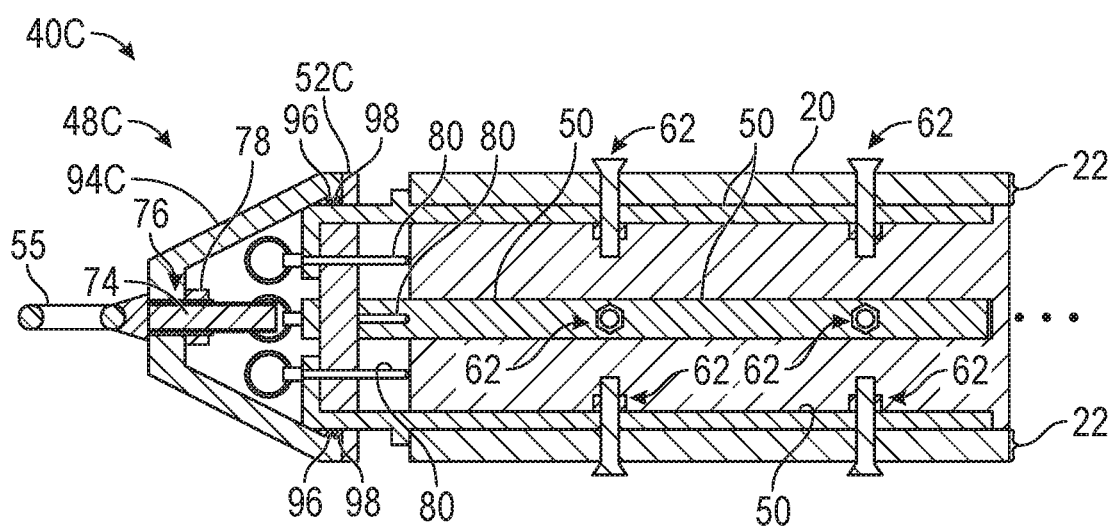
FIG. 9 is an axial cross-section profile of a further example of the pull head and the pipe segment of FIG. 4, in accordance with an embodiment of the present disclosure.

To help illustrate, another example of a (e.g., internal) pull head 40C, which includes a coned tip 94C, secured to the tubing 22 of a pipe segment 20 is shown in FIG. 9. As depicted, the pull head 40C includes pull plates 50, threaded fasteners 62, and pins 80. In some embodiments, the pull plates 50 of FIG. 9 may generally match the pull plates of FIG. 6, the threaded fasteners 62 of FIG. 9 may generally match the threaded fasteners 62 of FIG. 6, and/or the pins 80 of FIG. 9 may generally match the pins 80 of FIG. 6. In addition to the coned tip 94C, as depicted in FIG. 9, the end assembly 48C of the pull head 40C includes a pull ring 55 and an end cap 52C. In some embodiments, the pull ring 55 of FIG. 9 may generally match the pull ring 55 of FIG. 6.

However, as depicted in FIG. 9, the pull ring 55 is secured to the coned tip 94C, for example, instead of directly to the end cap 52C as in FIG. 8. Additionally, as depicted in FIG. 9, the coned tip 94C is secured to the end cap 52C. In particular, as in the depicted example, in some embodiments, the coned tip 94C may be secured to the end cap 52C via tip threading 96, which is implemented on the coned tip 94C to matingly interface (e.g., engage) with end cap threading 98 implemented on the end cap 52C. In other words, in such embodiments, the coned tip 94C may be secured to the end cap 52C at least in part by screwing the coned tip 94C onto the end cap 52C. Furthermore, as in the depicted example, in some embodiments, the pull ring 55 may be a discrete component with a threaded stem 74 and, thus, secured in a pull ring opening 76 implemented in the coned tip 94C via one or more pull ring nuts 78.

However, it should be appreciated that the depicted example is merely intended to be illustrative and not limiting. For example, in other embodiments, the end cap 52C of the pull head 40C in FIG. 9 may additionally include a sidewall portion 92 that is extended toward the pipe segment tubing 22 secured to the pull head 40C. Additionally or alternatively, in other embodiments, a pull ring 55 of a pull head 40 may be integrated with a coned tip 94 of the pull head 40, for example, instead of being a discrete component. Furthermore, as mentioned above, the techniques described in the present disclosure may additionally or alternatively be used to implement an external pull head 40.

Figure 10:
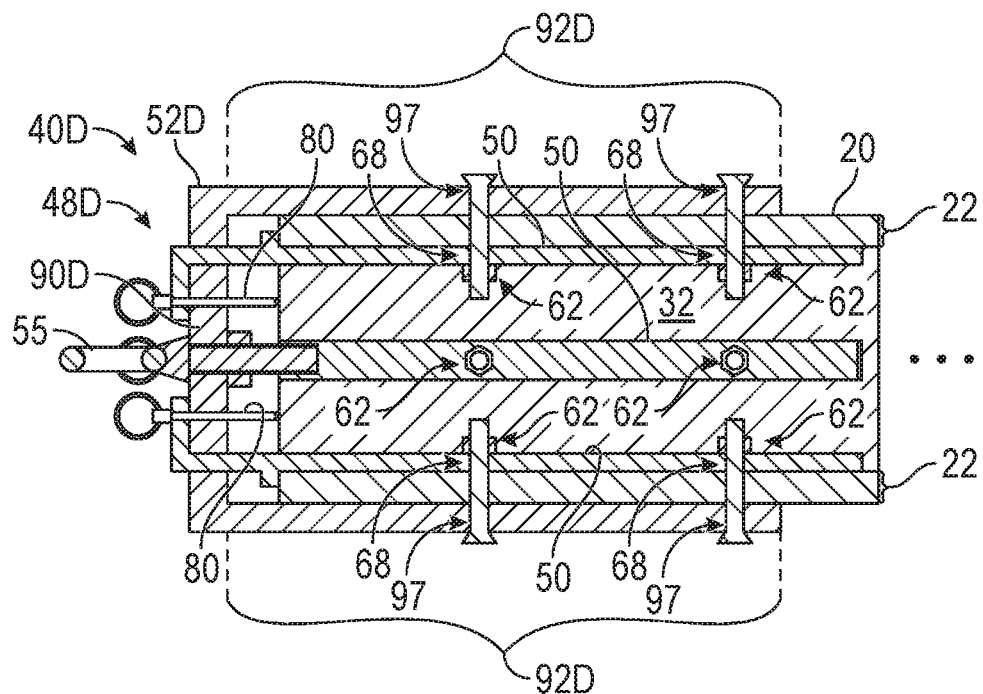
FIG. 10 is an axial cross-section profile of another example of the pull head and the pipe segment of FIG. 4, in accordance with an embodiment of the present disclosure.

To help illustrate, another example of a (e.g., external) pull head 40D secured to the tubing 22 of a pipe segment 20 is shown in FIG. 10. As depicted, the pull head 40D includes pull plates 50, threaded fasteners 62, and pins 80. In some embodiments, the pull plates 50 of FIG. 10 may generally match the pull plates of FIG. 6, the threaded fasteners 62 of FIG. 10 may generally match the threaded fasteners 62 of FIG. 6, and/or the pins 80 of FIG. 10 may generally match the pins 80 of FIG. 6. Additionally, as depicted in FIG. 10, the end assembly 48D of the pull head 40D includes a pull ring 55 and an end cap 52D. In some embodiments, the pull ring 55 of FIG. 10 may generally match the pull ring 55 of FIG. 6.

However, as depicted, the end cap 52D of FIG. 10 differs from the end cap 52A of FIG. 6. In particular, as depicted in FIG. 10, the end cap 52D includes a plate portion 90D as well as a sidewall portion 92D, which extends out from the plate portion 90D in an axial direction. In other words, similar to the end cap 52B of FIG. 8, the end cap 52D of FIG. 10 may facilitate blocking external environmental conditions from entering the pipe bore 32 of the pipe segment 20.

Nevertheless, as depicted, the end cap 52D of FIG. 10 also differs from the end cap 52B of FIG. 8. In particular, as depicted, the inner surface diameter and the length of the sidewall portion 92D of the end cap 52D in FIG. 10 are greater than the sidewall portion 92B of the end cap 52B in FIG. 8 to enable the end cap 52D to circumferentially cover a portion of the outer surface of the pipe segment tubing 22 secured to the pull head 40D. Since circumferentially covering the pipe segment tubing 22, as in the depicted example, in some embodiments, the pull head 40D may include pull plate fastener openings 68 implemented in its pull plates 50 as well as end cap fastener openings 97 implemented in its end cap 52D.

However, it should be appreciated that the depicted example is merely intended to be illustrative and not limiting. In particular, in other embodiments, an end cap 52 of a pull head 40 that is implemented to circumferentially cover a portion of an outer surface of pipe segment tubing 22 may not include end cap fastener openings 97, for example, due to the end cap 52 already being secured to the pipe segment tubing 22 as a result of pull plates 50 of the pull head 40 being secured to the pipe segment tubing 22 and the end cap 52 being secured to the pull plates 50. Moreover, as described above, in other embodiments, an end assembly 48 of a pull head 40 may additionally include a coned tip 94.

Figure 11:
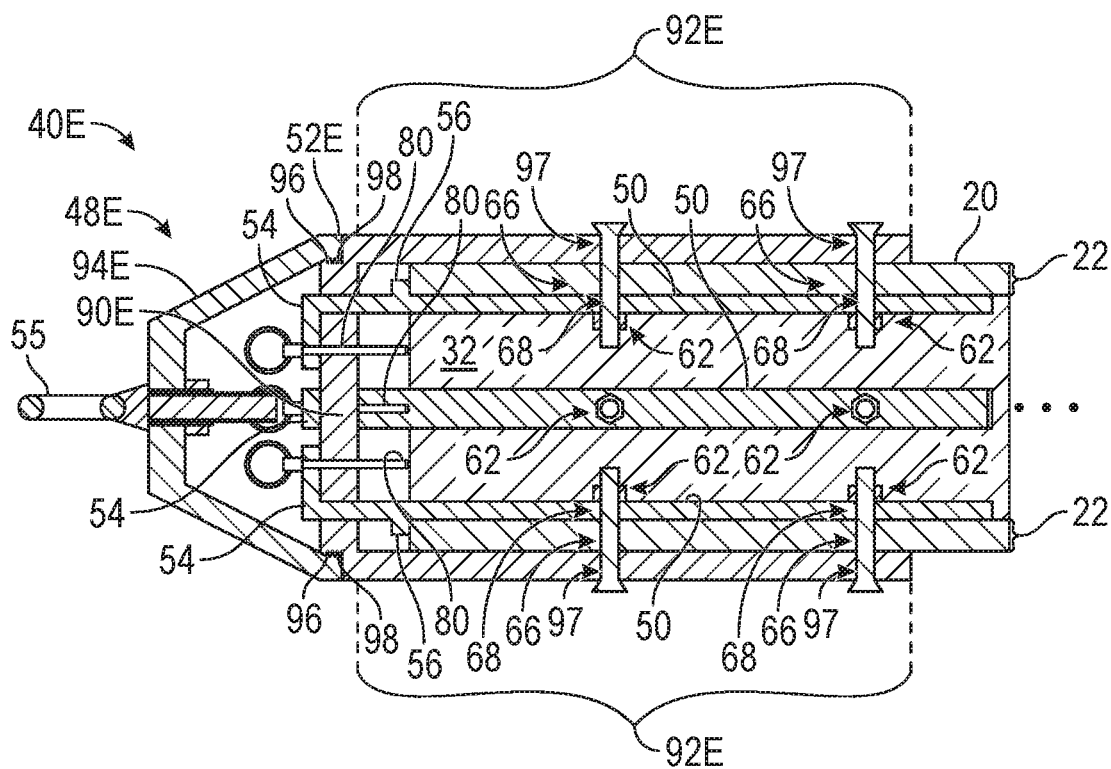
FIG. 11 is an axial cross-section profile of a further example of the pull head and the pipe segment of FIG. 4, in accordance with an embodiment of the present disclosure.

To help illustrate, another example of a (e.g., external) pull head 40E, which includes a coned tip 94E, secured to the tubing 22 of a pipe segment 20 is shown in FIG. 11. As depicted, the pull head 40E includes pull plates 50, threaded fasteners 62, and pins 80. In some embodiments, the pull plates 50 of FIG. 11 may generally match the pull plates of FIG. 6, the threaded fasteners 62 of FIG. 11 may generally match the threaded fasteners 62 of FIG. 6, and/or the pins 80 of FIG. 11 may generally match the pins 80 of FIG. 6. In addition to the coned tip 94E, as depicted in FIG. 11, the end assembly 48E of the pull head 40E includes a pull ring 55 and an end cap 52E. In some embodiments, the pull ring 55 of FIG. 11 may generally match the pull ring of FIG. 6.

However, as depicted, the end cap 52E of FIG. 11 differs from the end cap 52A of FIG. 6. In particular, as depicted in FIG. 11, the end cap 52E includes a plate portion 90E as well as a sidewall portion 92E, which extends out from the plate portion 90D in an axial direction. In other words, similar to the end cap 52D of FIG. 10, the end cap 52E of FIG. 11 may circumferentially cover a portion of the outer surface of the pipe segment tubing 22 secured to the pull head 40E and, thus, facilitate blocking external environmental conditions from entering the pipe bore 32 of the pipe segment 20. Since circumferentially covering the pipe segment tubing 22, as in the depicted example, in some embodiments, the pull head 40E may include pull plate fastener openings 68 implemented in its pull plates 50 as well as end cap fastener openings 97 implemented in its end cap 52E.

Additionally, as depicted in FIG. 11, the pull ring 55 is secured to the coned tip 94E, for example, instead of directly to the end cap 52E as in FIG. 10. Furthermore, as depicted in FIG. 11, the coned tip 94E is secured to the end cap 52E. In particular, as in the depicted example, in some embodiments, the coned tip 94E may be secured to the end cap 52E via tip threading 96, which is implemented on the coned tip 94E to matingly interface (e.g., engage) with end cap threading 98 implemented on the end cap 52E. In other words, in such embodiments, the coned tip 94E may be secured to the end cap 52E at least in part by screwing the coned tip 94E onto the end cap 52E.

However, it should be appreciated that the depicted example is merely intended to be illustrative and not limiting. In particular, in other embodiments, an end cap 52 of a pull head 40 that is implemented to circumferentially cover a portion of the outer surface of pipe segment tubing 22 may not include end cap fastener openings 97, for example, due to the end cap 52 already being secured to the pipe segment tubing 22 as a result of pull plates 50 of the pull head 40 being secured to the pipe segment tubing 22 and the end cap 52 being secured to the pull plates 50. Moreover, as described above, the techniques described in the present disclosure may additionally or alternatively be used to implement an internal pull head 40.

In any case, as in each of the examples described above, a pull plate 50 may be inserted into a pipe bore 32 of a pipe segment 20 and secured to the tubing 22 of the pipe segment 20 while its locking tab 54 is oriented inwardly, its guide tab 56 is oriented outwardly, and its guide tab 56 directly abuts the pipe segment tubing 22. When a pull plate 50 is already inserted into the pipe bore 32, at least in some instances, it may be difficult for an operator, such as a service technician, to identify a proper location on the tubing 22 of the pipe segment 20 at which to implement a pipe segment fastener opening 66, for example, due to the location of a corresponding pull plate fastener opening 68 on the pull plate 50 being obfuscated from view by the tubing 22 of the pipe segment 20. Thus, to facilitate determining the proper location at which to implement the pipe segment fastener opening 66, the pull plate 50 may be laid against an outer surface of the pipe segment tubing 22 while its locking tab 54 is oriented outwardly, its guide tab 56 is oriented inwardly, and its guide tab 56 directly abuts the pipe segment tubing 22. In other words, to facilitate determining the proper location of the pipe segment fastener opening 66, the pull plate 50 may be laid against the outer surface of the pipe segment tubing 22 while in an orientation that is opposite an orientation with which the pull plate 50 is to be secured to the pipe segment tubing 22.

Figure 12:
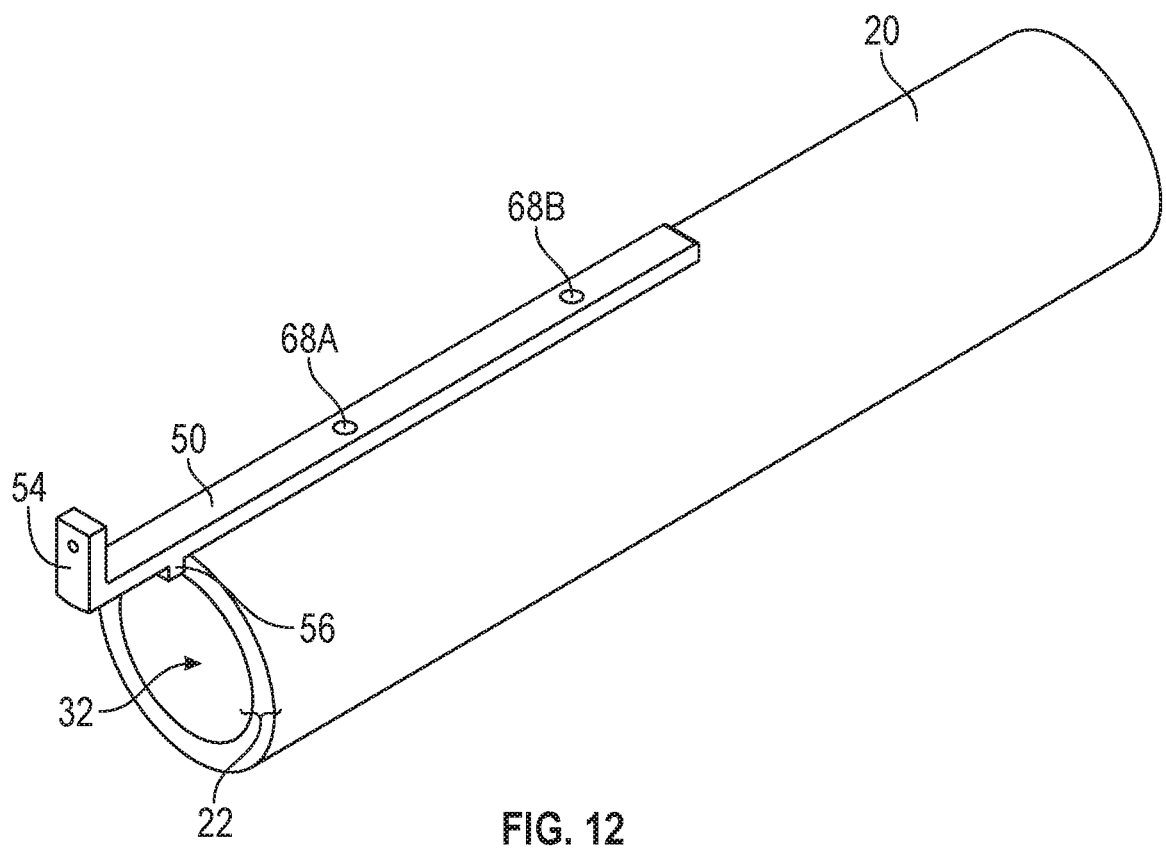
FIG. 12 is a perspective view of a pull plate of FIG. 4 laid against an outer surface of pipe segment tubing while in a first orientation, in accordance with an embodiment of the present disclosure
Figure 13:
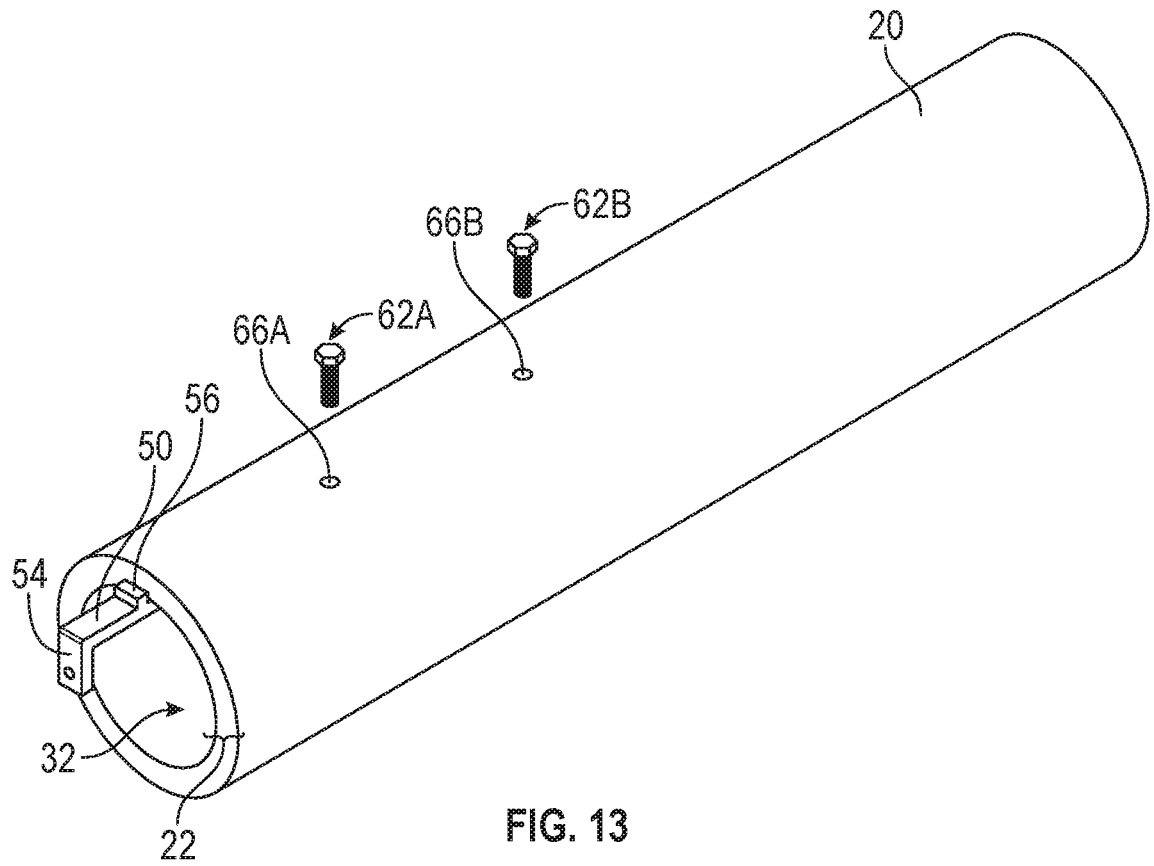
FIG. 13 is a perspective view of a pull plate of FIG. 4 laid against an inner surface of pipe segment tubing while in a second (e.g., different and/or opposite) orientation, in accordance with an embodiment of the present disclosure.

To help illustrate, an example of a pull plate 50 laid against the tubing 22 of a pipe segment 20 while in a first orientation is shown in FIG. 12 and an example of the pull plate 50 inserted into the pipe bore 32 of the pipe segment 20 while in a second (e.g., different and/or opposite) orientation is shown in FIG. 13. Although obfuscated from view in FIG. 13, the pull plate 50 includes multiple pull plate fastener openings 68—namely a first pull plate fastener opening 68A and a second pull plate fastener opening 68B. Additionally, as depicted, the pull plate 50 includes a locking tab 54 and a guide tab 56, which extend out in opposite directions.

In particular, as depicted in FIGS. 12 and 13, the guide tab 56 on the pull plate 50 directly abuts the pipe segment tubing 22 while in the first orientation as well as while in the second orientation. However, as depicted in FIG. 12, the guide tab 56 on the pull plate 50 is oriented (e.g., facing) inwardly and the locking tab 54 on the pull plate 50 is oriented outwardly while the pull plate 50 is in the first orientation. On the other hand, as depicted in FIG. 13, the guide tab 56 on the pull plate is oriented (e.g., facing) outwardly and the locking tab 54 on the pull plate 50 is oriented inwardly while the pull plate 50 is in the second orientation.

As described above, a pull plate 50 of a pull head 40 may be secured to pipe segment tubing 22 while its guide tab 56 directly abuts the pipe segment tubing 22 and it is in an (e.g., second) orientation in which its locking tab 54 is oriented (e.g., facing) inwardly and its guide tab 56 is oriented outwardly. In particular, to facilitate securing the pull plate 50 to the pipe segment tubing 22, a pipe segment fastener opening 66 implemented in the pipe segment tubing 22 may be aligned with a corresponding pull plate fastener opening 68 implemented in the pull plate 50 and a threaded fastener 62 may be secured therein. For example, a first pipe segment fastener opening 66A in the pipe segment tubing 22 may be aligned with the first pull head fastener opening 68A in the pull plate 50 and a first threaded fastener 62A may be secured therein. Additionally, a second pipe segment fastener opening 66B in the pipe segment tubing 22 may be aligned with the second pull head fastener opening 68B in the pull plate 50 and a second threaded fastener 62B may be secured therein.

Since the pull plate 50 is secured to the pipe segment tubing 22 while its guide tab 56 directly abuts the pipe segment tubing 22, the proper location at which to implement a pipe segment fastener opening 66 on the pipe segment tubing 22 may be governed by the distance between the guide tab 56 and a corresponding pull plate fastener opening 68 on the pull plate 50. For example, the proper location at which to implement the first pipe segment fastener opening 66A on the pipe segment tubing 22 may be governed by the distance between the guide tab 56 and the first pull plate fastener opening 68A on the pull plate 50. Additionally, the proper location at which to implement the second pipe segment fastener opening 66B on the pipe segment tubing 22 may be governed by the distance between the guide tab 56 and the second pull plate fastener opening 68B on the pull plate 50. However, when the pull plate 50 is inserted into the pipe bore 32 of the pipe segment 20 such that its guide tab 56 directly abuts the tubing 22 of the pipe segment 20, the location of a pull plate fastener opening 68 on the pull plate 50 may be obfuscated from view, which, at least in some instances, may make it difficult for an operator, such as a service technician, to identify a proper location at which to implement a pipe segment fastener opening 66 in the pipe segment tubing 22.

Since the distance between a guide tab 56 and a pull plate fastener opening 68 on a pull plate 50 remains unchanged regardless of its orientation, to facilitate determining a proper location at which to implement a pipe segment fastener opening 66, the pull plate 50 may be laid against an outer surface of the pipe segment tubing 22 while its guide tab 56 directly abuts the pipe segment tubing 22 and the pull plate 50 is in an (e.g., first) orientation in which its locking tab 54 is oriented (e.g., facing) outwardly and its guide tab 56 is oriented inwardly. In other words, the pull plate 50 may be laid against the pipe segment tubing while in the first orientation to facilitate determining the proper location of one or more pipe segment fastener openings 66 during a first time period and subsequently secured to the pipe segment tubing while in a second (e.g., opposite and/or different) orientation during a second (e.g., subsequently and/or non-overlapping) time period. By laying the pull plate 50 against the outer surface of the pipe segment tubing 22 in this manner, an operator, such as a service technician, may determine the proper location at which to implement a pipe segment fastener opening 66 based at least in part on where a corresponding pull plate fastener opening 68 overlaps with the pipe segment tubing 22. For example, the operator may determine the proper location at which to implement the first pipe segment fastener opening 66A based at least in part on where the first pull plate fastener opening 68A overlaps with the pipe segment tubing 22 and the proper location at which to implement the second pipe segment fastener opening 66B based at least in part on where the second pull plate fastener opening 68B overlaps with the pipe segment tubing 22. In this manner, a pull head 40 may be implemented to facilitate identifying the proper location at which to implement a pipe segment fastener opening 66 on a pipe segment 20 to be secured to the pull head 40, which, at least in some instances, may facilitate improving efficiency with which the pull head 40 may be secured to the pipe segment 20 and, thus, deployment efficiency of a pipeline system 10 in which the pipe segment 20 is to be deployed using the pull head 40.

Figure 14:
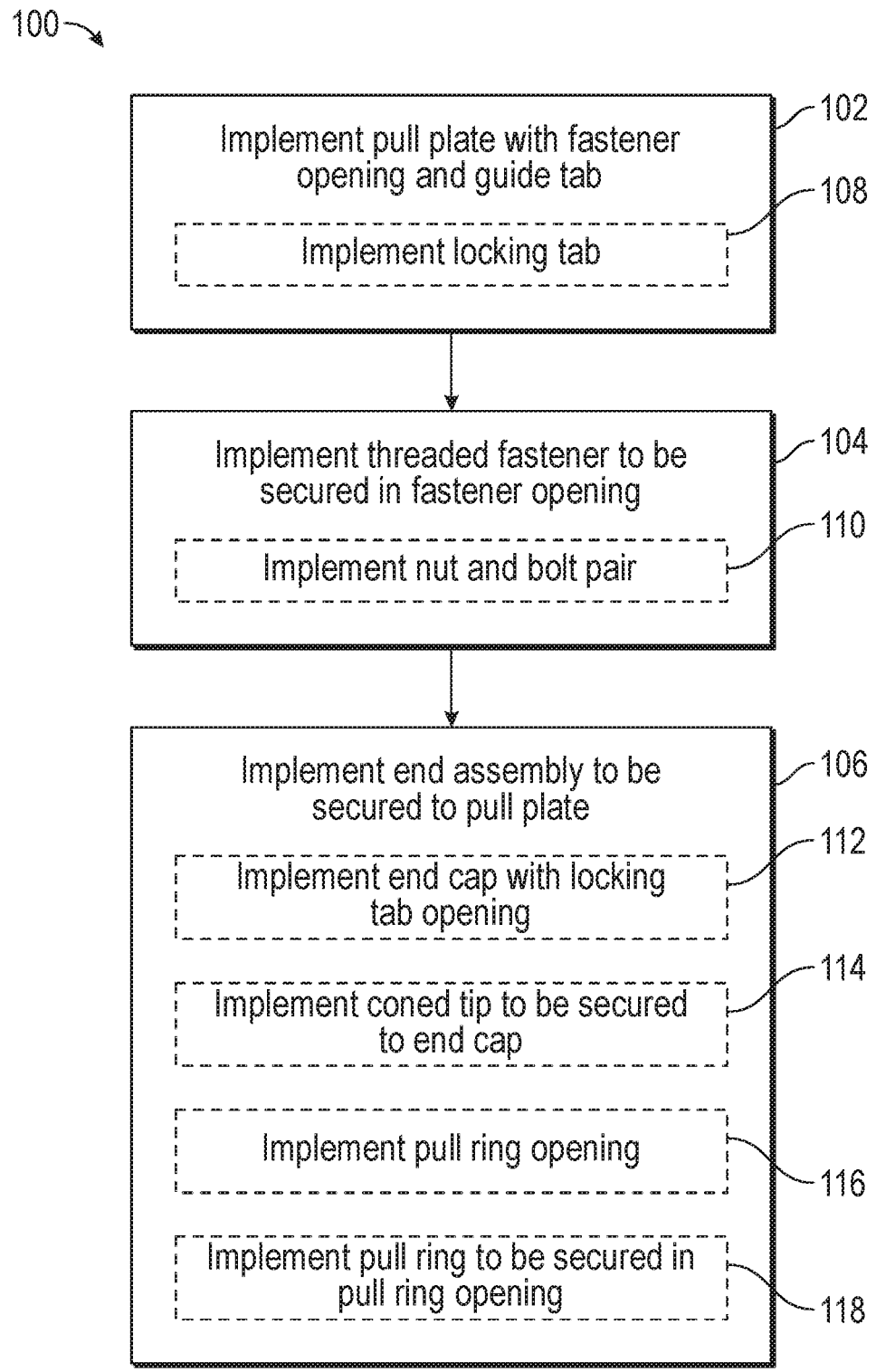
FIG. 14 is an example of a process for implementing a pull head, in accordance with an embodiment of the present disclosure.

To help further illustrate, an example of a process 100 for implementing a pull head 40 is described in FIG. 14. Generally, the process 100 includes implementing a pull plate with a fastener opening and a guide tab (process block 102). Additionally, the process 100 generally includes implementing a threaded fastener to be secured in the fastener opening (process block 104) and implementing an end assembly to be coupled to the pull plate (process block 106).

Although described in a specific order, which corresponds with an embodiment of the present disclosure, it should be appreciated that the example process 100 is merely intended to be illustrative and not limiting. In particular, in other embodiments, a process 100 for implementing a pull head 40 may include one or more additional process blocks and/or omit one or more of the depicted process blocks. Additionally or alternatively, in other embodiments, one or more of the depicted process blocks may be performed in a different order, for example, such that the end assembly 48 is implemented before the pull plate 50.

In any case, as described above, a pull head 40 may include one or more pull plates 50, which are implemented to be secured to the tubing 22 of a pipe segment 20. In particular, as described above, a pull plate 50 of the pull head 40 may include a guide tab 56 and one or more pull plate fastener openings 68. As such, implementing the pull head 40 may include implementing one or more pull plates 50, which each include a guide tab 56 and one or more pull plate fastener openings 68 (process block 102). More specifically, in some embodiments, a pull plate 50 may be implemented at least in part by milling the pull plate 50 from a block of material, such as metal. Additionally or alternatively, the pull plate 50 may be implemented at least in part by deforming (e.g., bending and/or molding) material, such as metal or plastic.

As described above, in some embodiments, a pull plate 50 of a pull head 40 may additionally include a locking tab 54, which is implemented to facilitate securing the pull plate 50 to an end assembly 48 of the pull head 40. Thus, in such embodiments, implementing the pull plate 50 may include implementing a locking tab 54 on the pull plate 50 (process block 108). In other embodiments, a pull plate 50 of a pull head 40 may be secured to the end assembly 48 of the pull head 40 via a different technique, such as threading that is implemented on the pull plate 50 to matingly engage (e.g., interlock and/or interface) with threading implemented in the end assembly 48.

In any case, as described above, a pull head 40 may additionally include one or more threaded fasteners 62, which are each implemented to be inserted and secured in at least a pull plate fastener opening 68 and a corresponding pipe segment fastener opening 66 implemented in the tubing 22 of a pipe segment 20 to facilitate securing the pull head 40 to the pipe segment 20. As such, implementing the pull head 40 may include implementing one or more threaded fasteners 62 to be secured in corresponding pull plate fastener openings 68 in the pull plate 50, for example, in addition to corresponding pipe segment fastener opening 66 implemented in the tubing 22 of the pipe segment 20 and/or corresponding end cap fastener openings 97 implemented in an end cap 52 of the pull head 40 (process block 104). Additionally, as described above, in some embodiments, a threaded fastener 62 of a pull head 40 may include a fastener nut 70 and a fastener bolt 64. Thus, in such embodiments, implementing the threaded fastener 62 may include implementing a fastener nut 70 and a fastener bolt 64 pair (process block 110).

Moreover, as described above, a pull head 40 may include an end assembly 48, which is implemented to be secured to one or more pull plates 50 of the pull head 40. Thus, implementing the pull head 40 may include implementing an end assembly 48 to be secured to one or more of its pull plates 50 (process block 160). In particular, as described above, the end assembly 48 may include an end cap 52, which is implemented to be secured to one or more of its pull plates 50.

Additionally, as described above, in some embodiments, a pull plate 50 of a pull head 40 may be secured to an end cap 52 of the pull head 40 via a locking tab 54 implemented on the pull plate 50 and a corresponding locking tab opening 58 implemented in the end cap 52. In other words, in such embodiments, implementing the end assembly 48 of the pull head 40 may include implementing an end cap 52 with one or more locking tab openings 58 (process block 112). More specifically, in some embodiments, in some embodiments, the end cap 52 may be implemented at least in part by milling the end cap 52 from a block of material, such as metal. Additionally or alternatively, the end cap 52 may be implemented at least in part by deforming (e.g., bending and/or molding) material, such as metal or plastic.

Furthermore, as described above, in some embodiments, an end assembly 48 of a pull head 40 may additionally include a coned tip 94, which is implemented to be secured to an end cap 52 in the end assembly 48, for example, to facilitate reducing the resistance to movement of the pull head 40 and, thus, movement of a pipe segment 20 secured to the pull head 40. Accordingly, in such embodiments, implementing the end assembly 48 may include implementing a coned tip 94 to be secured to the end cap 52 of the end assembly 48 (process block 114). More specifically, in some embodiments, in some embodiments, the coned tip 94 may be implemented at least in part by milling the coned tip 94 from a block of material, such as metal. Additionally or alternatively, the coned tip 94 may be implemented at least in part by deforming (e.g., bending and/or molding) material, such as metal or plastic.

Moreover, as described above, an end assembly 48 of a pull head 40 may additionally include a pull ring 55 As described above, in some embodiments, the pull ring 55 may be a discrete component and, thus, secured to the pull head 40 via a pull ring opening 76 implemented in an end cap 52 or a coned tip 94 of the end assembly 48. Thus, in such embodiments, implementing the end assembly 48 may include implementing a pull ring opening 76 (e.g., in end cap 52 or coned tip 94) (process block 116) and implementing a pull ring 55 to be secured in the pull ring opening 76 (process block 118). In other embodiments, the pull ring 55 may be integrated with the end cap 52 or the coned tip 94, for example, at least in part by milling them from a block of material, such as metal, as a unit. In this manner, a pull head 40 that facilitates identifying the proper location at which to implement pipe segment fastener openings 66 in the tubing 22 of a pipe segment 20 to be secured to the pull head 40 may be implemented.

Figure 15:
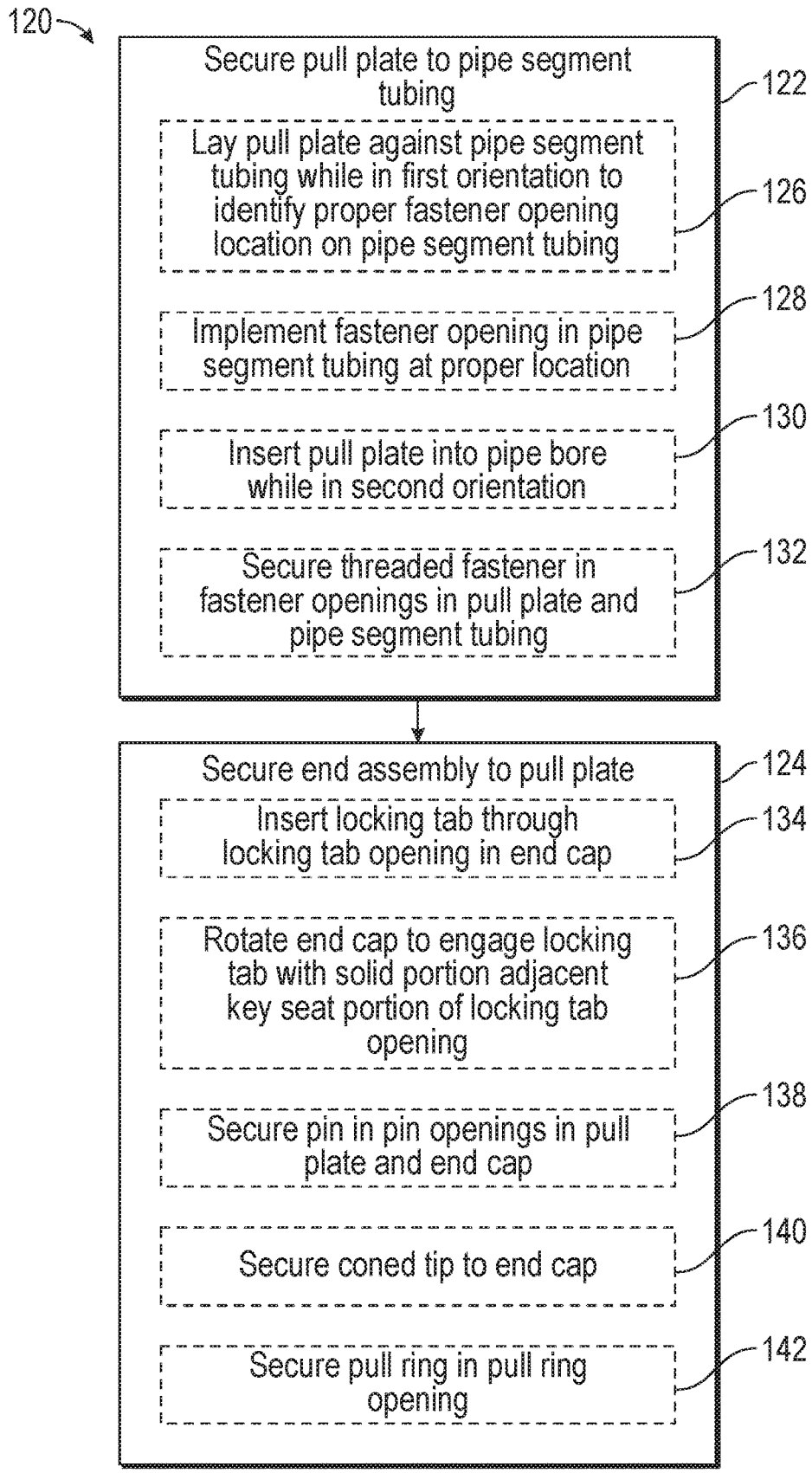
FIG. 15 is an example of a process for securing a pull head to the tubing of a pipe segment, in accordance with an embodiment of the present disclosure.

To help further illustrate, an example of a process 120 for securing a pull head 40 to the tubing 22 of a pipe segment 20 is described in FIG. 15. Generally, the process 120 includes securing a pull plate to pipe segment tubing (process block 122). Additionally, the process 120 generally includes securing an end assembly to the pull plate (process block 124).

Although described in a specific order, which corresponds with an embodiment of the present disclosure, it should be appreciated that the example process 120 is merely intended to be illustrative and not limiting. In particular, in other embodiments, a process 120 for securing a pull head 40 to the tubing 22 of a pipe segment 20 may include one or more additional process blocks and/or omit one or more of the depicted process blocks. Additionally or alternatively, in other embodiments, one or more of the depicted process blocks may be performed in a different order, for example, such that the end assembly 48 is secured to the pull plate 50 before the pull plate 50 is secured to the pipe segment tubing 22.

In any case, as described above, a pull head 40 may include one or more pull plates 50, which are each implemented to be secured to the tubing 22 of a pipe segment 20 to facilitate securing the pull head 40 to the pipe segment 20. Thus, securing the pull head 40 to the pipe segment 20 may include securing one or more pull plates 50 to the tubing 22 of the pipe segment 20 (process block 122). As described above, a pull plate 50 of a pull head 40 may be secured to pipe segment tubing 22 at least in part by aligning a pull plate fastener opening 68 implemented in the pull plate 50 with a corresponding pipe segment fastener opening 66 implemented in the pipe segment tubing 22 and securing a threaded fastener 62 therein.

To facilitate identifying a proper location at which to implement a pipe segment fastener opening 66 in pipe segment tubing 22, as described above, in some embodiments, a pull plate 50 may be laid against the outer surface of the pipe segment tubing 22 such that its guide tab 56 directly abuts the pipe segment tubing 22 while the pull plate 50 is in a first orientation in which its locking tab 54 is oriented outwardly and its guide tab 56 is oriented inwardly (process block 126). In particular, as described above, in such embodiments, an operator, such as a service technician, may identify (e.g., determine) a proper location at which to implement a pipe segment fastener opening 66 in the pipe segment tubing 22 based at least in part on where a corresponding pull plate fastener opening 68 in the pull plate 50 overlaps with the pipe segment tubing 22. The operator may then implement a pipe segment fastener opening 66 at the (e.g., proper) location identified on the pipe segment tubing 22, for example, at least in part by milling and/or drilling a hole in the tubing 22 of the pipe segment 20 (process block 128).

As described above, in some embodiments, the pull plate 50 may then be inserted into the pipe bore 32 of the pipe segment 20 such that its guide tab 56 directly abuts the pipe segment tubing 22 while the pull plate 50 is in a second (e.g., different and/or opposite) orientation in which its locking tab 54 is oriented inwardly and its tab 56 is oriented outwardly (process block 130). Additionally, as described above, in such embodiments, a threaded fastener 62 may be inserted and secured in the pipe segment fastener opening 66 implemented in the pipe segment tubing 22 as well as a corresponding pull plate fastener opening 68 implemented in the pull plate 50, for example, in addition to a corresponding end cap fastener opening 97 implemented in the end cap 52 of the pull head 40 (process block 132). More specifically, in some such embodiments, the threaded end of a fastener bolt 64 in the threaded fastener 62 may be inserted through the pipe segment fastener opening 66 and the pull plate fastener opening 68 and a fastener nut 70 in the threaded fastener 62 may be tightened on the threaded end of the fastener bolt 64 from within the pipe bore 32 of the pipe segment 20.

Moreover, as described above, a pull head 40 to be secured to a pipe segment 20 may include an end assembly 48, which is implemented to be secured to one or more pull plates 50 of the pull head. Thus, securing the pull head 40 to the pipe segment 20 may include securing the end assembly 48 to one or more pull plates 50 of the pull head 40 (process block 124). In particular, as described above, the one or more pull plates 50 of the pull head 40 may be secured to an end cap 52 of the end assembly 48.

Additionally, as described above, in some embodiments, a pull plate 50 of a pull head 40 may be secured to an end cap 52 of the pull head 40 via a locking tab 54 implemented on the pull plate 50 and a corresponding locking tab opening 58 implemented in the end cap 52. In particular, in some such embodiments, a locking tab opening 58 in the end cap 52 may include an insertion portion 86, which is implemented to enable the locking tab 54 of the pull plate 50 to be inserted therethrough, and a key seat portion 88, which is connected to and smaller than the insertion portion 86 of the locking tab opening 58. Thus, in such embodiments, securing the end assembly 48 to the pull plate 50 may include inserting the locking tab 54 on the pull plate 50 through the insertion portion 86 of the locking tab opening 58 in the end cap 52 (process block 134) and rotating (e.g., actuating) the end cap 52 relative to the pull plate 50 such that the pull plate 50 moves from the insertion portion 86 of the locking tab opening 58 to the key seat portion 88 of the locking tab opening 58 and, thus, interlocks with a solid portion of the end cap 52 adjacent the key seat portion 88 of the locking tab opening 58 (process block 136). To facilitate maintaining the pull plate 50 in the key seat portion 88 of the locking tab opening 58, as described above, in some embodiments, a pin 80 may be inserted and secured in a locking tab pin opening 82 implemented in the locking tab 54 of the pull plate 50 as well as a corresponding end cap pin opening 84 implemented in the end cap 52 of the pull head 40 (process block 138).

Furthermore, as described above, in some embodiments, the end assembly 48 of a pull head 40 may include a coned tip 94, which is implemented to be secured to an end cap 52 of the end assembly 48, for example, to facilitate reducing the resistance to movement of the pull head 40 and, thus, movement of the pipe segment 20 secured to the pull head 40. Accordingly, in such embodiments, securing the end assembly 48 to the pull plate 50 may include securing a coned tip 94 to an end cap 52 of the end assembly 48, which is or is to be secured to the pull plate 50 (process block 140). In particular, as described above, in some embodiments, the coned tip 94 may be secured to the end cap 52 at least in part by screwing the coned tip 94 onto the end cap 52 using tip threading 96 implemented on the coned tip 94 and end cap threading 98 implemented on the end cap 52.

Moreover, as described above, in some embodiments, the end assembly 48 of a pull head 40 may include a pull ring 55, which is implemented to be secured to an end cap 52 or a coned tip 94 of the end assembly 48 via a pull ring opening 76 implemented therethrough. Thus, in such embodiments, securing the end assembly 48 to the pull plate 50 may include inserting and securing a threaded stem 74 of the pull ring 55 in a pull ring opening 76, for example, which is implemented in the end cap 52 or a coned tip 94 of the end assembly 48 (process block 142). In this manner, the present disclosure provides techniques for implementing and/or deploying a pull head such that the pull head facilitates identifying proper locations at which to implement pipe segment fastener openings in the tubing of a pipe segment to be secured to the pull head, which, at least in some instances, may facilitate improving efficiency with which the pull head may be secured to the pipe segment and, thus, deployment efficiency of a pipeline system in which the pipe segment is to be deployed using the pull head.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipe deployment system comprising a pull head, wherein:
   the pull head is configured to be secured to a pipe segment comprising tubing that defines a pipe bore and a fluid conduit implemented in a tubing annulus of the tubing to facilitate disposing the pipe segment within an external bore; and
   the pull head comprises:
      a pull plate comprising a guide tab, a locking tab, and a pull plate fastener opening, wherein the pull plate is configured to be secured to the tubing of the pipe segment at least in part by securing a threaded fastener in the pull plate fastener opening and a pipe segment fastener opening that is aligned with the pull plate fastener opening while the guide tab is oriented outwardly and directly abuts the tubing of the pipe segment; and
      an end assembly comprising an end cap configured to be secured to the pull plate and a pull ring configured to be secured to one or more cables to enable the pull head to be pulled into the external bore, through the external bore, or both, wherein the end cap comprises a locking tab opening having:
         an insertion portion configured to enable the locking tab of the pull plate to be inserted through the locking tab opening in the end cap; and
         a key seat portion connected to and smaller than the insertion portion of the locking tab opening, wherein the locking tab on the pull plate is configured to interlock with a solid portion of the end cap to facilitate securing the end assembly to the pull plate when the pull plate is moved from the insertion portion of the locking tab opening to the key seat portion of the locking tab opening.

2. The pipe deployment system of claim 1, wherein the threaded fastener comprises:
   a fastener bolt configured to be inserted through the pipe segment fastener opening and the pull plate fastener opening; and
   a fastener nut configured to be tightened on a threaded end of the fastener bolt from within the pipe bore of the pipe segment to facilitate securing the pull plate to the tubing of the pipe segment.

3. The pipe deployment system of claim 1, wherein the end cap of the pull head is configured to circumferentially cover a portion of an outer surface of the tubing of the pipe segment while the pull head is secured to the pipe segment.

4. The pipe deployment system of claim 1, wherein:
   the end assembly of the pull head comprises a coned tip configured to be secured to the end cap of the end assembly to facilitate reducing resistance to movement of the pull head; and
   the pull ring of the end assembly is configured to be secured to the coned tip to enable pulling the pull head via the one or more cables.

5. The pipe deployment system of claim 1, wherein the pull head comprises another pull plate, wherein:
   the other pull plate comprises another guide tab and another pull plate fastener opening;
   the other pull plate is configured to be secured to the tubing of the pipe segment at least in part by securing another threaded fastener in the other pull plate fastener opening and another pipe segment fastener opening that is aligned with the other pull plate fastener opening while the other guide tab is oriented outwardly and directly abuts the tubing of the pipe segment; and
   the end cap of the end assembly is configured to be secured to the pull plate and the other pull plate.

6. A method of securing a pull head to a pipe segment to facilitate disposing the pipe segment within an external bore, comprising:
   laying a pull plate of the pull head against an outer surface of tubing of the pipe segment such that a guide tab on the pull plate directly abuts the tubing of the pipe segment, the guide tab on the pull plate is oriented inwardly, and a locking tab on the pull plate is oriented outwardly;
   implementing a pipe segment fastener opening in the tubing of the pipe segment based at least in part on where a pull plate fastener opening implemented in the pull plate overlaps with the tubing of the pipe segment while the guide tab on the pull plate directly abuts the tubing of the pipe segment and is oriented inwardly;

inserting the pull plate of the pull head into a pipe bore of the pipe segment such that the guide tab on the pull plate directly abuts the tubing of the pipe segment the guide tab on the pull plate is oriented outwardly, and the locking tab on the pull plate is oriented inwardly;

securing the pull plate to the tubing of the pipe segment while the guide tab on the pull plate directly abuts the tubing of the pipe segment and is oriented outwardly at least in part by securing a threaded fastener in the pipe segment fastener opening and the pull plate fastener opening; and securing an end assembly of the pull head that comprises a pull ring to the pull plate of the pull head at least in part by inserting the locking tab on the pull plate through a locking tab opening implemented in an end cap of the end assembly and rotating the end cap relative to the pull plate to interlock the locking tab with a solid portion of the end cap that is adjacent the locking tab opening to enable the pull head to be pulled into the external bore, through the external bore, or both.

7. The method of claim 6, wherein securing the end assembly of the pull head to the pull plate of the pull head comprises:
   securing the pull ring of the end assembly to a coned tip of the end assembly;
   securing the coned tip to the end cap of the end assembly; and
   securing the end cap to the pull plate.

8. The method of claim 6, wherein securing the pull plate to the tubing of the pipe segment comprises:
   inserting a fastener bolt of the threaded fastener through the pipe segment fastener opening implemented in the tubing of the pipe segment and the pull plate fastener opening implemented in the pull plate; and
   tightening a fastener nut of the threaded fastener on a threaded end of the fastener bolt from within the pipe bore of the pipe segment.

9. The method of claim 6, wherein securing the end assembly of the pull head to the pull plate comprises circumferentially covering a portion of the outer surface of the tubing of the pipe segment using the end cap of the end assembly.

10. The method of claim 6, comprising, before securing the pull plate to the tubing of the pipe segment, implementing another pipe segment fastener opening in the tubing of the pipe segment based at least in part on where another pull plate fastener opening implemented in the pull plate overlaps with the tubing of the pipe segment while the guide tab on the pull plate directly abuts the tubing of the pipe segment and is oriented inwardly, wherein securing the pull plate to the tubing of the pipe segment comprises securing another threaded fastener in the other pipe segment fastener opening and the other pull plate fastener opening while the guide tab on the pull plate directly abuts the tubing of the pipe segment and is oriented outwardly.

11. The method of claim 6, comprising:
   laying another pull plate of the pull head against the outer surface of the tubing of the pipe segment such that another guide tab on the other pull plate directly abuts the tubing of the pipe segment and is oriented inwardly;
   implementing another pipe segment fastener opening in the tubing of the pipe segment based at least in part on where another pull plate fastener opening implemented in the other pull plate overlaps with the tubing of the pipe segment while the other guide tab on the other pull plate directly abuts the tubing of the pipe segment and is oriented inwardly;
   inserting the other pull plate of the pull head into the pipe bore of the pipe segment such that the other guide tab on the other pull plate directly abuts the tubing of the pipe segment and is oriented outwardly;
   securing the other pull plate to the tubing of the pipe segment while the other guide tab on the other pull plate directly abuts the tubing of the pipe segment and is oriented outwardly at least in part by securing another threaded fastener in the other pipe segment fastener opening and the other pull plate fastener opening; and
   securing the end assembly of the pull head to the other pull plate to enable the pull head to be pulled into the external bore, through the external bore, or both.

12. A pull head comprising:
   a pull plate, wherein the pull plate comprises:
      a pull plate fastener opening configured to facilitate securing the pull plate to tubing of a pipe segment;
      a guide tab that extends out in a first direction, wherein the guide tab is configured to directly abut the tubing of the pipe segment and to be oriented inwardly to facilitate identifying a location at which to implement a pipe segment fastener opening in the tubing of the pipe segment that is to be aligned with the pull plate fastener opening; and
      a locking tab that extends out in a second direction opposite the first direction, wherein the pull plate is configured to be secured to the tubing of the pipe segment while the locking tab is oriented inwardly and the guide tab is oriented outwardly; and
   an end assembly comprising an end cap configured to be secured to the pull plate and a pull ring configured to be secured to one or more cables to enable pulling the pull head, wherein the end cap comprises a locking tab opening having:
      an insertion portion configured to enable the locking tab of the pull plate to be inserted through the locking tab opening in the end cap; and
      a key seat portion connected to and smaller than the insertion portion of the locking tab opening, wherein the locking tab on the pull plate is configured to interlock with a solid portion of the end cap to facilitate securing the end assembly to the pull plate when the pull plate is moved from the insertion portion of the locking tab opening to the key seat portion of the locking tab opening.

13. The pull head of claim 12, wherein the pull plate is configured to be:
   laid against an outer surface of the tubing of the pipe segment during a first time period such that the guide tab on the pull plate directly abuts the tubing of the pipe segment to enable identifying the location at which to implement the pipe segment fastener opening in the tubing of the pipe segment based at least in part on where the pull plate fastener opening in the pull plate overlaps with the tubing of the pipe segment; and
   inserted into a pipe bore of the pipe segment during a second time period after the first time period such that the guide tab on the pull plate directly abuts the tubing of the pipe segment to facilitate aligning the pipe segment fastener opening implemented in the tubing of the pipe segment with the pull plate fastener opening in the pull plate.

* * * * *